United States Patent [19]

Sliger

[11] Patent Number: 4,982,704
[45] Date of Patent: Jan. 8, 1991

[54] VEHICLE COOLING SYSTEM SUBASSEMBLY AND PARTS THEREFOR

[75] Inventor: Boyd P. Sliger, Knoxville, Tenn.

[73] Assignee: Robertshaw Controls Company, Richmond, Va.

[21] Appl. No.: 464,368

[22] Filed: Jan. 12, 1990

Related U.S. Application Data

[63] Continuation of Ser. No. 329,571, Mar. 28, 1989, Pat. No. 4,913,101.

[51] Int. Cl.$^5$ .............................................. F01P 7/16
[52] U.S. Cl. ..................................... 123/41.1; 236/34.5
[58] Field of Search .............. 123/41.08, 41.09, 41.10; 137/315, 454.2; 236/34, 34.5; 403/348, 349

[56] References Cited

U.S. PATENT DOCUMENTS

| | | | |
|---|---|---|---|
| 4,091,991 | 5/1978 | Sliger | 123/41.08 |
| 4,245,781 | 1/1981 | Sliger | 236/34.5 |
| 4,288,031 | 9/1981 | Hoss | 123/41.1 |
| 4,583,499 | 4/1986 | Hovey | 123/41.1 |

Primary Examiner—Noah P. Kamen
Attorney, Agent, or Firm—Candor, Candor & Tassone

[57] ABSTRACT

A vehicle cooling system subassembly, parts therefor and methods of making the same are provided, the subassembly comprising an outlet housing having an opening therein, and a vehicle type thermostat disposed in the opening of the outlet housing and having a housing provided with a valve seat that is controlled by a movable valve member which is interconnected to a temperature responsive device that is carried by the thermostat housing, the outlet housing having a positioning device thereon, the thermostat housing having a positioning device thereon engaging the positioning device of the outlet housing to rotationally orient the thermostat in the opening of the outlet housing in a desired rotational position thereof, the outlet housing having a slot therein, the thermostat housing having a tab extending outwardly therefrom and wedgingly disposed in the slot to hold the thermostat in the opening of the outlet housing in the desired rotational position thereof.

27 Claims, 4 Drawing Sheets

VEHICLE COOLING SYSTEM SUBASSEMBLY AND PARTS THEREFOR

CROSS REFERENCE TO RELATED APPLICATION

This application is a continuation patent application of its copending parent patent application, Ser. No. 329,571 filed Mar. 28, 1989, now U.S. Pat. No. 4,913,101.

1. FIELD OF THE INVENTION

This invention relates to a new vehicle cooling system subassembly, new parts therefor and new methods of making the same.

2. PRIOR ART STATEMENT

It is known to provide a vehicle cooling system subassembly comprising an outlet housing having an opening therein, and a vehicle type thermostat disposed in the opening of the outlet housing and having a housing means provided with a valve seat that is controlled by a movable valve member which is interconnected to a temperature responsive device that is carried by the housing means, the outlet housing having positioning means thereon, the thermostat housing means having positioning means thereon engaging the positioning means of the outlet housing to rotationally orient the thermostat in the opening of the outlet housing in a desired rotational position thereof. For example, see the Sliger U.S. Pat. No. 4,245,781.

In such an arrangement as set forth above, the frictional engagement of the positioning means is sufficient to initially retain the thermostat in the opening of the outlet housing while an engine assembler places a gasket between the outlet housing and the engine and then places bolts through mounting openings in the outlet housing and gasket prior to threading the bolts into the engine to secure the subassembly thereto.

SUMMARY OF THE INVENTION

It is one of the features of this invention to provide a new vehicle cooling system subassembly having means for more positively retaining the thermostat in the desired rotational position in the opening of the outlet housing so that the subassembly can be handled more efficiently for subsequent mounting to a vehicle engine or the like.

In particular, it has been found that with the advent of robotic type assembly machines and with the need for more efficient assembly methods and the elimination of labor on modern automobile engine assembly lines, there has become a need for the thermostat to be presented to the engine assembly operation as a more complete unit that is ready to be mounted.

Accordingly, it was found according to the teachings of this invention that the thermostat could be provided with tab means extending outwardly therefrom that would be received in slot means formed in the outlet housing so that when the thermostat is subsequently rotated to the desired rotational position thereof in the opening of the outlet housing, the tab means will be wedgingly disposed in the slot means to more positively hold that thermostat in the opening of the outlet housing in the desired rotational position thereof for the above purpose.

For example, one embodiment of this invention provides a vehicle cooling system subassembly comprising an outlet housing having an opening therein, and a vehicle type thermostat disposed in the opening of the outlet housing and having a housing means provided with a valve seat that is controlled by a movable valve member which is interconnected to a temperature responsive device that is carried by the housing means, the outlet housing having positioning means thereon, the thermostat housing means having positioning means thereon engaging the positioning means of the outlet housing to rotationally orient the thermostat in the opening of the outlet housing in a desired rotational position thereof, the outlet housing having slot means therein, the thermostat housing means having tab means extending outwardly therefrom and wedgingly disposed in the slot means to hold the thermostat in the opening of the outlet housing in the desired rotational position thereof.

It is another feature of this invention to provide means for retaining the mounting bolts in the mounting openings of the outlet housing so that the mounting bolts will be handled with the outlet housing as a substantially self-contained subassembly until it is desired to utilize the mounting bolts to mount that outlet housing to a vehicle engine or the like.

Accordingly, it is an object of this invention to provide a new vehicle cooling system subassembly having one or more of the novel features of this invention as set forth above or hereinafter shown or described.

Another object of this invention is to provide a new method of making such a vehicle cooling system subassembly, the method of this invention having one or more of the novel features of this invention as set forth above or hereinafter shown or described.

Another object of this invention is to provide a new vehicle type thermostat having one or more of the novel features of this invention as set forth above or hereinafter shown or described.

Another object of this invention is to provide a new method of making such a thermostat, the method of this invention having one or more of the novel features of this invention as set forth above or hereinafter shown or described.

Another object of this invention is to provide a new outlet housing for a vehicle cooling system, the outlet housing of this invention having one or more of the novel features of this invention as set forth above or hereinafter shown or described.

Another object of this invention is to provide a new method of making such an outlet housing, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
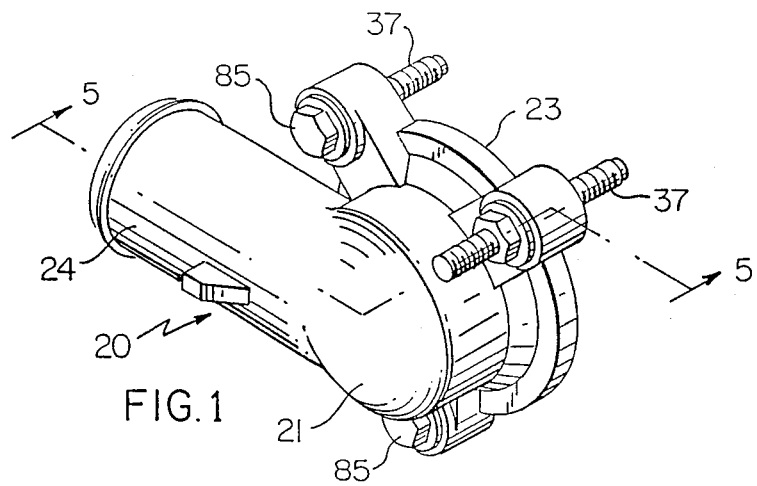
FIG. 1 is a perspective view of the new vehicle cooling system subassembly of this invention.

While the various features of this invention are hereinafter illustrated and described as being particularly adapted to provide a vehicle cooling system subassembly for an internal combustion engine of a transportation vehicle or the like, it is to be understood that the various features of this invention can be utilized singly or in various combinations thereof to provide a subassembly for other types of apparatus as desired.

Therefore, this invention is not to be limited to only the embodiment illustrated in the drawings, because the drawings are merely utilized to illustrate one of the wide variety of uses of this invention.

Figure 2:
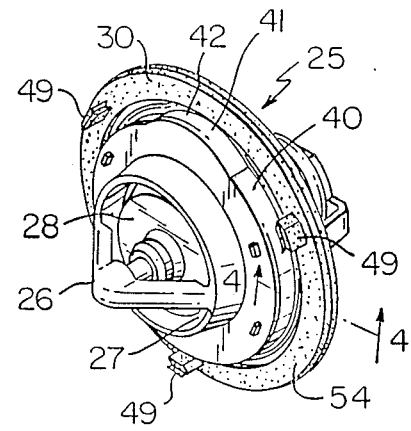
FIG. 2 is an enlarged perspective view of the new thermostat of this invention that is utilized in the subassembly of FIG. 1.
Figure 4:
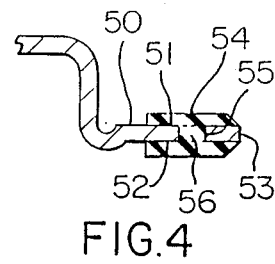
FIG. 4 is an enlarged fragmentary cross-sectional view taken on line 4—4 of FIG. 2.
Figure 5:
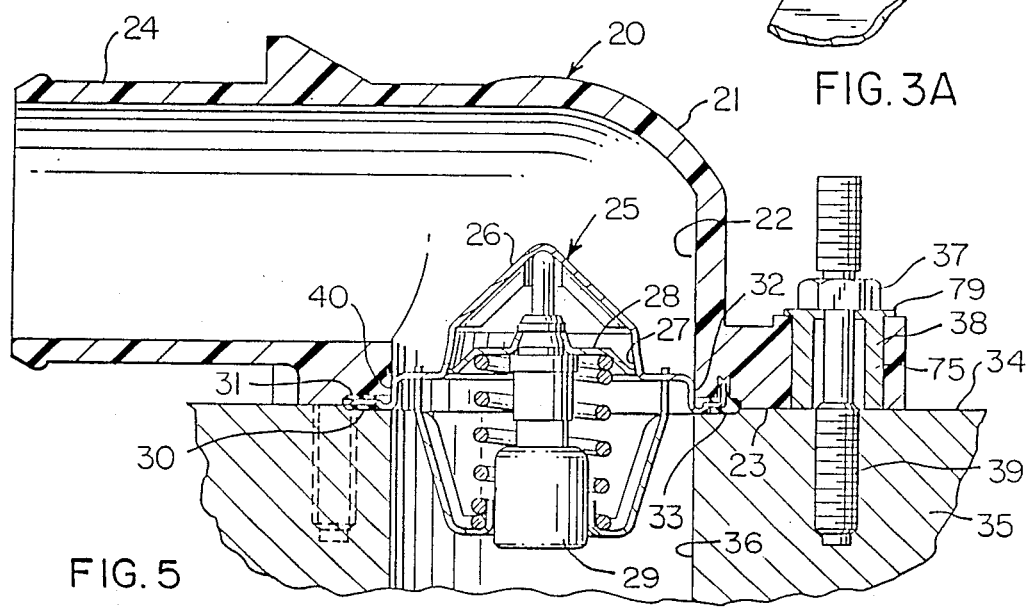
FIG. 5 is an enlarged fragmentary cross-sectional view taken on line 5—5 of FIG. 1 and illustrates the subassembly mounted to a vehicle engine.

Referring now to FIGS. 1 and 5, the new vehicle cooling system subassembly of this invention is generally indicated by the reference numeral 20 and comprises an outlet housing 21 having an opening 22 therein that interrupts a substantially flat end surface 23 thereof and extends through a tubular outlet portion 24 for coupling to a radiator hose or the like in a manner well known in the art. The vehicle cooling system subassembly 20 also comprises a vehicle type thermostat that is generally indicated by the reference numeral 25 in FIGS. 2 and 5 and the same is disposed in the opening 22 of the outlet housing 21 in a manner hereinafter set forth, the thermostat 25 having a housing means 26 provided with an annular valve seat 27 that is controlled by a movable valve member 28 that is interconnected to a temperature responsive device 29 that is carried by the housing means 26 in a manner well known in the art.

The housing means 26 of the thermostat 25 has an annular flange means 30 that is disposed in an annular recess 31 formed in the flat end surface 23 of the outlet housing 21 and surrounding the opening 22 at an end 32 thereof, the annular flange means 30 also being disposed in a cooperating annular recess 33 formed in a top surface 34 of a vehicle engine or engine block 35, the engine block 35 having an opening 36 therein that aligns with the end 32 of the opening 22 of the outlet housing 21 so as to provide a coolant flow path therebetween.

The outlet housing 21 is disposed so that its end surface 23 contacts the surface 34 of the engine block 35 and is fastened thereto by a plurality of mounting bolts 37 that pass through suitable mounting bolt means 38 of the outlet housing 21 to be threaded into threaded openings 39 in the engine block 35 as illustrated in FIG. 5.

The thermostat 25 is utilized to control the flow of coolant fluid from the engine block 35 to the engine radiator (not shown) in a manner well known in the art. For example, see the aforementioned Sliger U.S. Pat. No. 4,245,781, whereby this patent is being incorporated into this disclosure by this reference thereto.

Therefore, since the operation of a thermostat in an engine cooling system is well known, only the details necessary to understand the unique features of the subassembly 20 of this invention will now be described.

Figure 6:
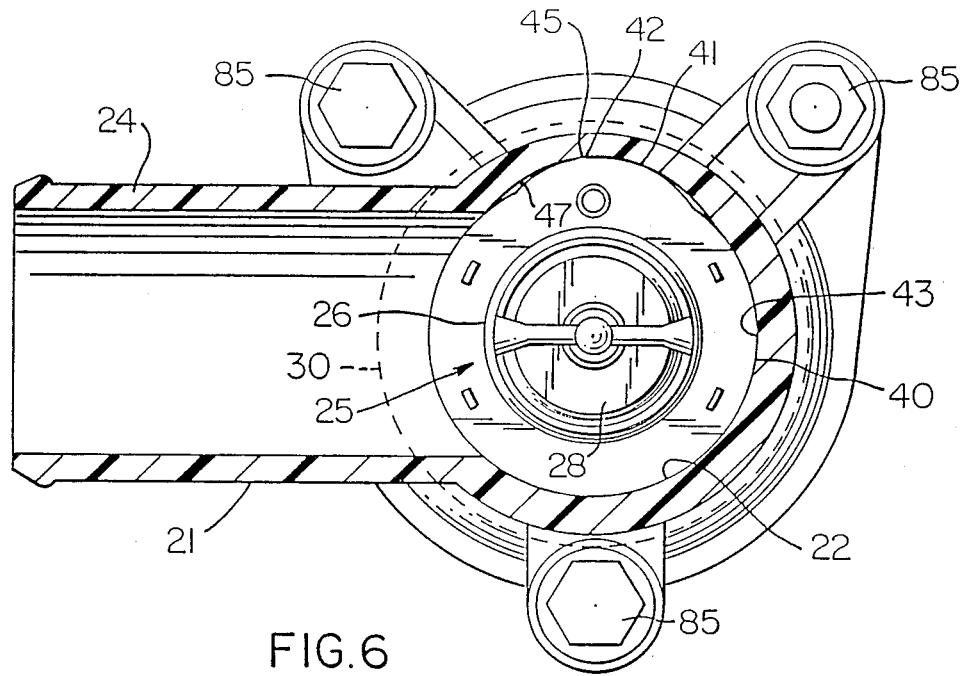
FIG. 6 is a cross-sectional view taken on line 6—6 of FIG. 5 and illustrates how the thermostat of FIG. 2 is initially inserted into the opening means of the outlet housing of FIG. 1 before the thermostat has been rotated to the desired rotational position thereof.
Figure 9:
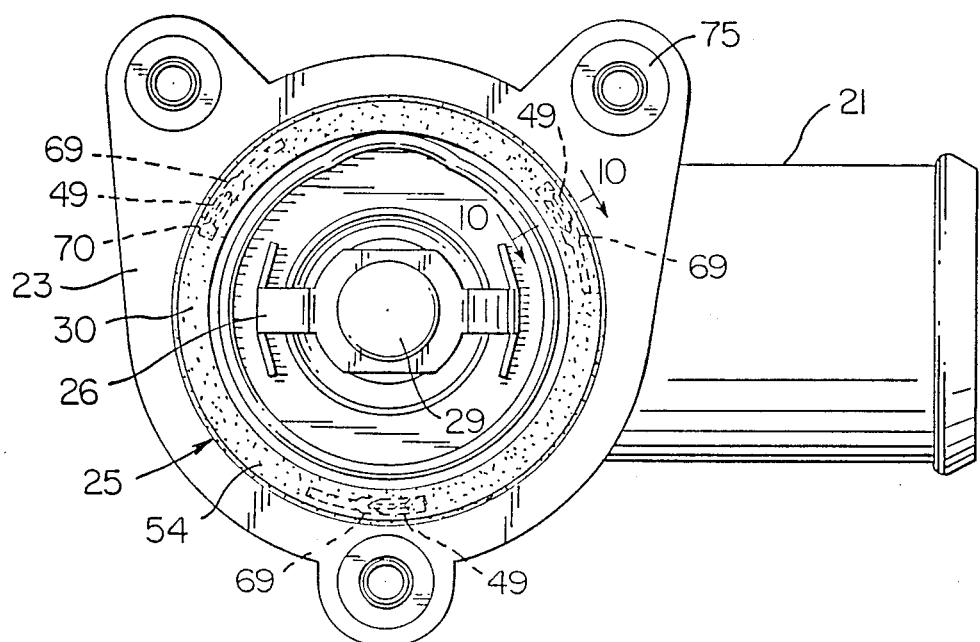
FIG. 9 is a view similar to FIG. 8 and illustrates the thermostat after the same has been disposed in the opening of the outlet housing of FIG. 8 and before the thermostat has been rotated to the desired rotational position thereof.

The housing means 26 of the thermostat 25 has a cylindrical section 40 that has substantially the same size circular transverse cross-sectional configuration throughout the length thereof except at an outwardly extending projection 41 thereof that is arcuate and has an apex 42 as best illustrated in FIGS. 6 and 9 whereby the projection 41 of the thermostat 25 comprises a positioning means for the thermostat 25 as will be apparent hereinafter.

The end 32 of the opening 22 in the outlet housing 21 defines a substantially cylindrical section 43 adjacent the surface 23 of the outlet housing 21 with the cylindrical section 43 defining substantially the same size circular transverse cross-sectional configuration throughout the length thereof except for a recess 44 that intersects with the cylindrical section 43 and has an apex 45, the recess 44 readily permitting the projection 41 on the thermostat 25 to be disposed therein when the thermostat 25 is initially disposed in the opening 22 of the outlet housing 21 in the manner illustrated in FIGS. 6 and 9 whereby the recess 44 defines positioning means of the outlet housing 21 as will be apparent hereinafter.

Figure 7:
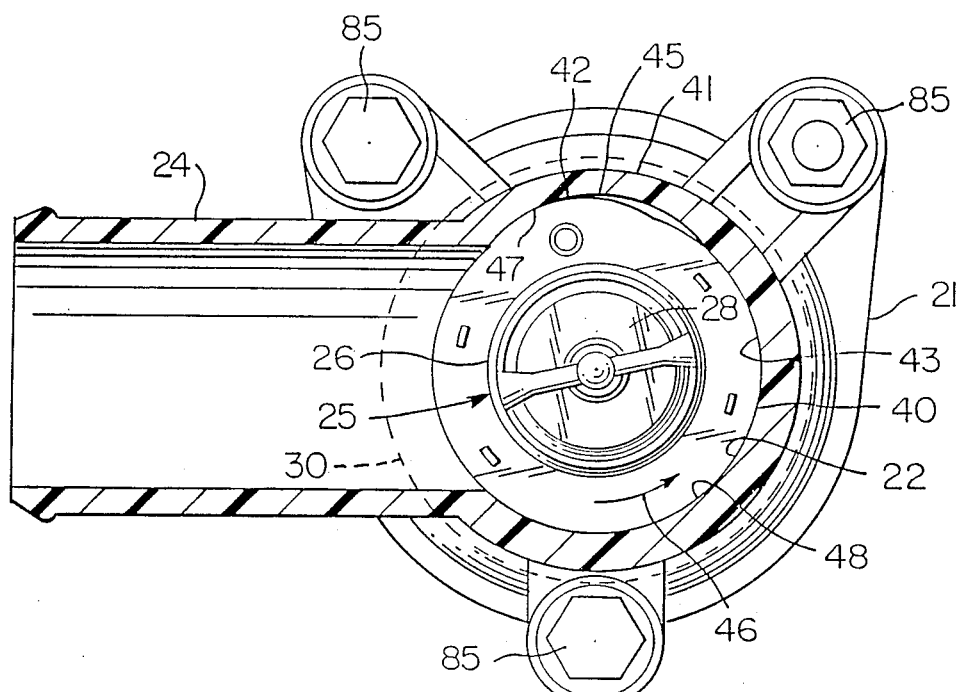
FIG. 7 is a view similar to FIG. 6 and illustrates the thermostat after the same has been rotated to the desired rotational position thereof.
Figure 8:
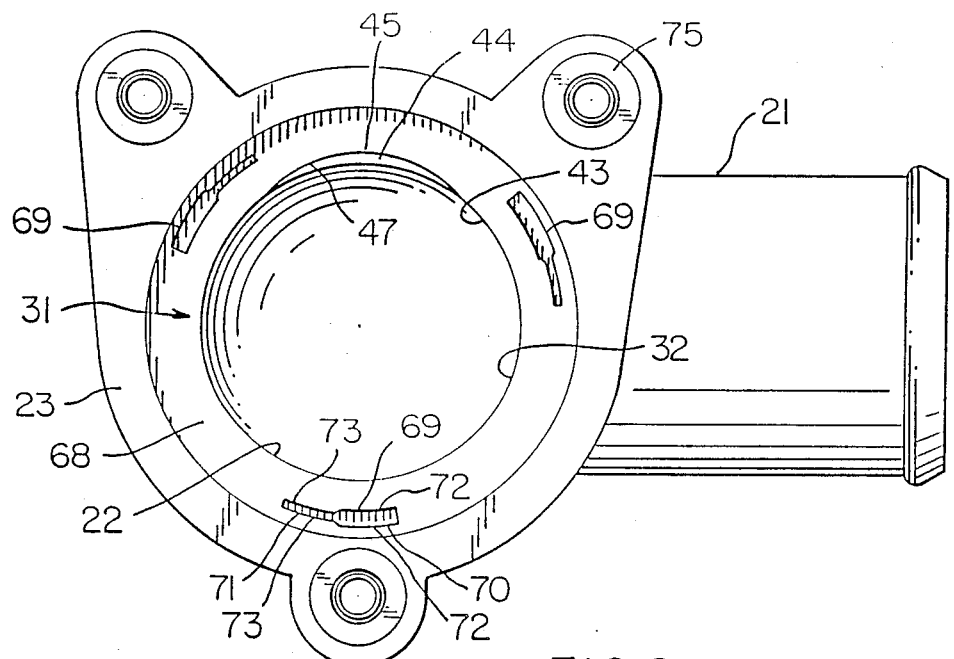
FIG. 8 is a bottom view of the outlet housing before the thermostat of FIG. 2 is inserted into the opening thereof.

Once the thermostat 25 has been disposed in the opening 22 with the apex 42 of its positioning means 41 aligned with the apex 45 of the recess means 44 of the outlet housing 21, the thermostat 25 is rotated, such as in the counterclockwise direction as represented by the arrow 46 in FIG. 7, to cause the projection 41 of the thermostat 25 to wedge against an internal peripheral surface 47 of the outlet housing 21 which is defined by the recess 44 as illustrated in FIG. 7 whereby such wedging action tends to cause the center of the thermostat construction 25 to move off a coaxial relation to the center of the opening 22 of the cylindrical section 43 and thereby cause the cylindrical section 40 of the thermostat 25 to wedge against an internal peripheral surface 48 of the outlet housing 22 in an area substantially diametrically opposite the apex 42 of the projection 41 as illustrated in FIG. 7.

Such frictional or wedging engagement of the positioning means 41 of the thermostat 25 and the positioning means 47 of the outlet housing 21 not only orients the rotational position of the thermostat 25 relative to the outlet housing 21 for any desired purpose or purposes, such as for the reasons set forth in the aforementioned Sliger U.S. Pat. No. 4,245,781, but also such wedging action was found to be sufficient for an engine assembler to have the thermostat 25 held in the outlet housing 21 while the assembler placed a gasket between the outlet housing 21 and the engine block 35 and threaded mounting bolts through mounting openings of the housing 21 to fasten the housing 21 to the engine block 35.

However, as previously stated, such frictional holding of the thermostat 25 solely by the wedgingly engaging positioning means 41 and 47 was found to be not sufficient for robotic or other handling of the subassembly 20 for more efficient engine assembling operations.

Therefore, according to the teachings of this invention, additional means are provided for uniquely holding the thermostat 25 in the desired rotational position of FIG. 7 and will now be described.

The thermostat 25 of this invention has a plurality of tab means 49 extending substantially transversely out of the annular flange means 30 thereof and are disposed in a spaced-apart circular array, three such tab means 49 being illustrated in the drawings.

The annular flange means 30 of the thermostat 25 is formed from a relatively rigid annular band 50 having opposed flat sides 51 and 52 and a peripheral edge means 53 as the housing means 26 that forms the annular band 50 is formed of metallic material as illustrated. The annular flange means 30 includes a flexible covering or coating material 54 secured on the annular band 50 in such a manner that the covering material 54 is disposed against the opposed flat sides 51 and 52 thereof and can actually cover the peripheral edge 53, if desired.

Figure 3:
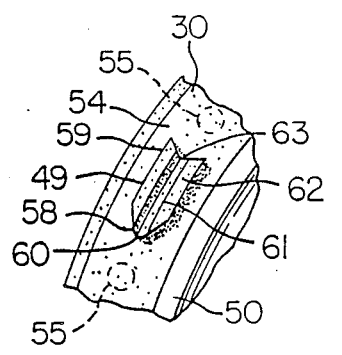
FIG. 3 is an enlarged fragmentary view looking downwardly on one of the tab means of the thermostat of FIG. 2.

For example, the flexible covering material 54 can comprise any suitable rubber-like or elastomeric material, such as nitrile rubber, and can be molded on the annular band 50 or be adhesively secured thereto as desired. However, if the material 54 is molded onto the annular band 50 of the thermostat 25 as illustrated in the drawings, the annular band 50 can be provided with a plurality of openings 55 that extend through the annular band 50 and in a circular array about the annular band 50 as illustrated in FIG. 3 and through which portions 56 of the material 54 will exude through and be disposed therein during the molding operation so as to mechanically anchor the covering material 54 to the annular band 50 as well as form an annular covering material on the side 52 of the annular band 50.

In this manner, the covering material 54 performs the sealing function of a gasket means not only between the thermostat 25 and the surface 34 of the engine 35, but also between the thermostat 25 and the surface 23 of the outlet housing 24 when the annular flange means 30 is compressed between the outlet housing 22 and engine 35 by the bolt means 37 being tightened to secure the subassembly 20 to the engine 35 as will be apparent hereinafter.

Therefore, it can be seen that a separate gasket is not needed with the subassembly 20 of this invention as the covering material 54 is self-contained with the thermostat 25 and since the thermostat 25 is substantially self-contained within the outlet housing 21 in the manner previously set forth, no separate gasket method step is needed when mounting the subassembly 20 to the engine 35 or the like.

Figure 3A:
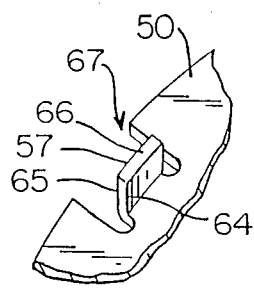
FIG. 3A is a perspective view similar to FIG. 3 and illustrates the tab means before the same has been covered with a flexible coating material.

Each tab means 49 of the thermostat 25 comprises a part 57 carved from the annular band 50 of the flange means 30 and bent at a right angle relative thereto as fully illustrated in FIG. 3A so that when the covering material 54 is molded onto the annular band 50 in the manner previously described, the covering material 54 also covers the upstanding rigid parts 57 to define the tab means 49 therewith.

The covering material 54 of the tab means 49 is so molded that the same define opposed ends 58 and 59 of each tab means 49 with the end 58 being substantially wedge-shaped or triangular as illustrated in FIG. 3 so as to provide a central or midpoint vertically disposed apex 60 while a groove 61 extends along a top 62 of the tab means 49 from the end 58 to the end 59 thereof and joins with a substantially V-shaped groove 63 formed along the vertical edge of the tab means 49 at the end 59 thereof for a purpose hereinafter described.

Therefore, it can be seen that the covering material 54 of each tab means 49 covers the opposed sides 64 and 65 of the part 57 thereof as well as covers the peripheral edge 66 of the respective part 57. In addition, the covering material 54 completely fills in the void area 67 that has been defined by cutting the parts 57 from the annular band 50 as illustrated.

The recess 31 formed in the end surface 23 of the outlet housing 21 defines an annular surface means 68 that is substantially flat. A plurality of elongated slot means 69 interrupt the surface 68 of the outlet housing 21 with the slot means 69 being disposed in a spaced apart circular array for cooperating with the tab means 49 of the thermostat 25 in a manner hereinafter described.

Each slot means 69 of the outlet housing 21 is formed of two sections 70 and 71 with the section 70 being wider than the section 71 so that the sidewalls 72 defined in the outlet housing 21 by the wider section 70 are spaced apart a greater distance than the sidewalls 73 defined by the narrower section 71 of the respective slot means 69 for a purpose hereinafter described, the depth of the slot means 69 being greater than the height of the tab means 49 while the width of the sections 70 is larger than the width of the tab means 49 and the width of the sections 71 is smaller than the width of the tab means 49 as will be readily apparent from FIGS. 10 and 12 for a purpose hereinafter described.

Figure 11:
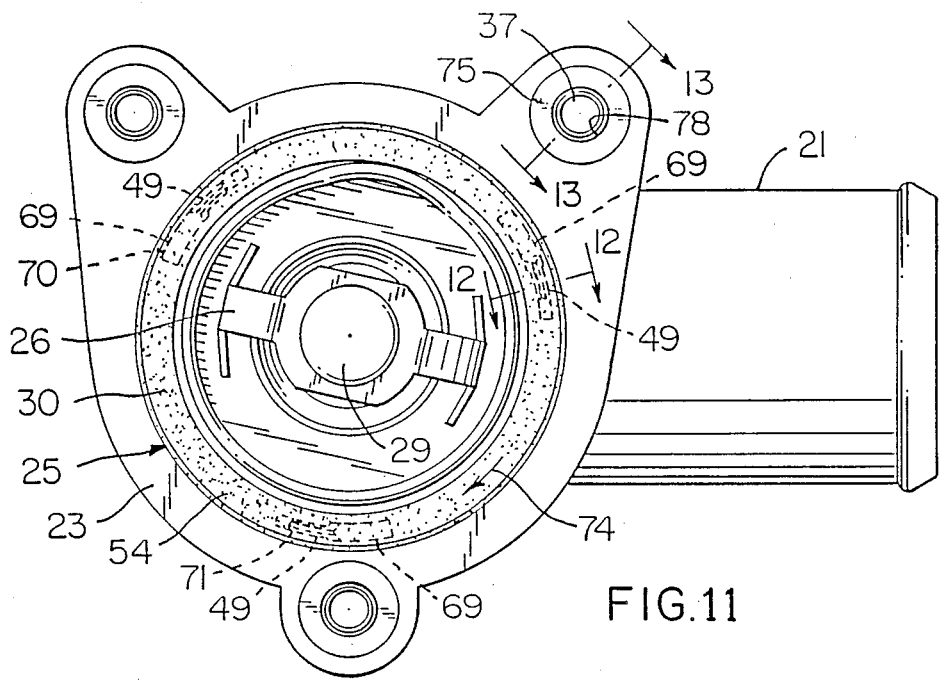
FIG. 11 is a view similar to FIG. 9 and illustrates the subassembly after the thermostat has been rotated to the desired rotational position thereof.
Figure 10:
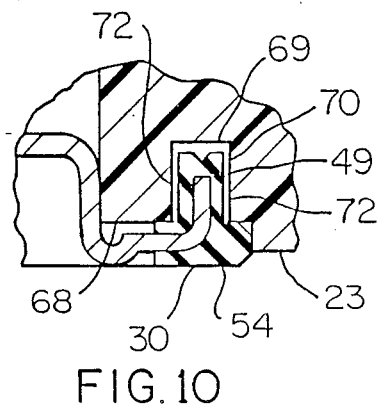
FIG. 10 is an enlarged fragmentary cross-sectional view taken on line 10—10 of FIG. 9.

The width and length of the slot means 69 in the outlet housing 21, as well as the length of the sections 70 and 71 thereof, are so arranged that when the thermostat 25 is initially inserted into the end 32 of the opening 22 of the outlet housing 21 with the positioning means 41 being centrally located in the recess means 44 of the outlet housing 21 as best illustrated in FIGS. 6 and 9, the tab means 49 of the thermostat construction 25 are readily received in the wider sections 70 of the slot means 69 as illustrated in FIG. 10 and then when the thermostat 25 is rotated from the position illustrated in FIG. 6 to the position illustrated in FIG. 7, which is in a counterclockwise direction 46 in FIG. 7 and in a clockwise direction 74 as illustrated in FIG. 11, the tab means 49 have the leading wedge-shaped ends 58 thereof camming into the narrower sections 71 of the slot means 69 so as to wedge therein as well as be wedged against the sidewall means 73 thereof as the center of the thermostat 25 is moved off the center of the opening 22 at the section 32 thereof by the positioning means 42 wedging against the positioning means 47 of the outlet housing 21 in the manner previously described, such wedging action of the tab means 49 being readily permitted by the resiliency or flexibility of the covering material 54 thereof as well as by the flexibility provided by the top grooves 61 and side grooves 63 of the tab means 49 previously described.

It has been found that such wedging action of the tab means 49 through the flexible covering material 54 thereof firmly holds the thermostat 25 in the desired rotational position thereof within the opening 22 of the outlet housing 21 as such wedging action of the tab means 49 in the narrow portions 71 of the slot means 69 is added to the frictionally holding feature of the engaged positioning means 41 and 47 as previously set forth so that the resulting subassembly 20 can be readily handled by robotic devices and/or other assembly means without having the thermostat 25 thereof come loose from the opening 22 of the outlet housing 21.

Figure 12:
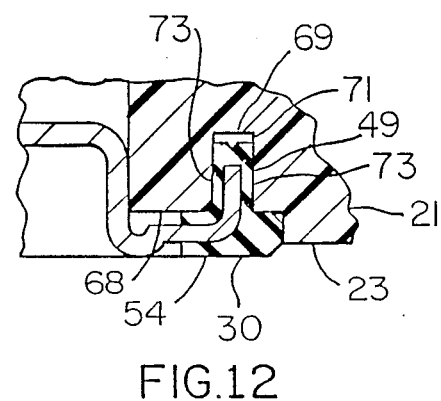
FIG. 12 is an enlarged fragmentary cross-sectional view taken on line 12—12 of FIG. 11.

Thus, it can be seen that it is a simple assembly method of this invention to securely fasten the thermostat 25 in its respective outlet housing 21 by merely inserting the thermostat 25 in such a manner that the positioning means 41 and 44 thereof respectively are aligned whereby the tab means 49 are received in the wider sections 70 of the slot means 69 and then when the thermostat 25 is rotated to wedge the positioning means 41 and 47 together, the tab means 49 are wedged in the narrower portions 71 of the slot means 69 to firmly hold the thermostat 25 in its desired rotational position as illustrated in FIGS. 7 and 11, such wedging action of the tab means 49 being fully illustrated in FIG. 12.

As previously stated, it is another feature of this invention to provide the subassembly 20 with means for carrying the bolt means 37 so that the bolt means 37 will be retained by the subassembly 20 during the handling thereof and will be readily available for bolting to the engine block 35 when the subassembly 20 is disposed in the proper position thereon.

Figure 14:
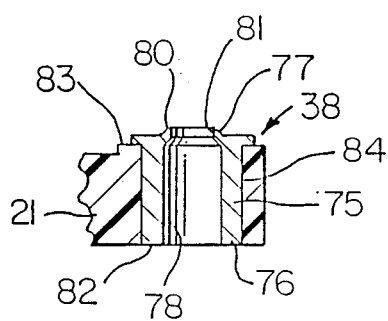
FIG. 14 is a view similar to FIG. 13 and illustrates the bolt mounting means of the outlet housing before the mounting bolts have been assembled thereto.

Such feature of this invention is provided by the unique bolt holding means 38 of this invention which comprise relatively rigid tubular members 75 each having opposed ends 76 and 77 and an opening means 78 passing through the opposed ends 76 and 77 thereof. The end 77 of each tubular member 75 has an annular flange 79 extending outwardly therefrom for a purpose hereinafter described and has an inner annular flange 80 that is disposed partially over the opening means 78 and is initially disposed at an angle as illustrated in FIG. 14 to define an opening 81 therethrough which is larger in diameter than when the annular flange 80 is forced downwardly into substantially a coplanar relationship with the outer annular flange 79 in the manner illustrated in FIG. 13 for retaining its respective bolt 37 therewith as will be apparent hereinafter.

While the outlet housing 21 can be formed of any suitable material, one working embodiment of the outlet housing 21 is formed of plastic material and when the same is molded in the configuration illustrated in the drawings, three metallic tubular members 75 of this invention are molded therein in such a manner that the end surface 82 of each member 75 is disposed substantially flush with the end surface 23 of the resulting outlet housing 21 and the annular flange 79 extends on top of a top surface 83 of the outlet housing 21 so that the annular flange 79 will prevent the respective tubular member 75 from pushing through a resulting opening 84 in the outlet housing 24 should the member 75 break loose from the material of the outlet housing 21 due to repeated thermal heating and cooling of the dissimilar materials that form the tubular members 76 and the outlet housing 21, such breaking loose of the tubular members 75 not being a problem once the outlet housing 21 has been installed on the engine 35 as it can be seen that the engine block 35 itself will cooperate with the annular flanges 79 to trap the tubular members 75 in place in the manner illustrated in FIG. 5.

Figure 13:
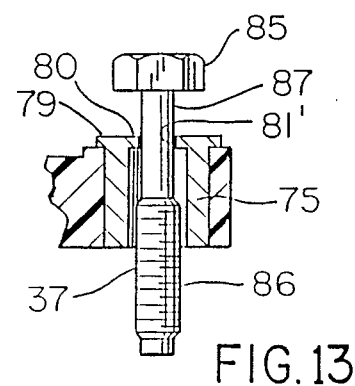
FIG. 13 is an enlarged fragmentary cross-sectional view taken on line 13—13 of FIG. 11 and illustrates how the mounting bolts for the vehicle cooling system subassembly are retained in the mounting openings of the outlet housing.

Each bolt 37 has a tightening head 85 spaced from a threaded shank portion 86 thereof by a reduced diameter cylindrical portion 87 as illustrated in FIG. 13 and the opening 81 in the angularly disposed inner flange 80 of each tubular member 65 has a diameter that readily permits the threaded shank portion 86 of a bolt 37 to initially pass therethrough and then when the head 85 of that bolt 37 is compacted against the annular flange 80 by a suitable force, the annular flange 80 is turned downwardly into substantially the same plane as the outer annular flange 79 as illustrated in FIG. 13 so that the turned downwardly flange 80 has the resulting opening 81' formed thereby to be of a diameter that is less than the outside diameter of the threaded shank portion 86 of the bolt 37 so that the bolt 37 cannot be removed out through the opening 81' of the respective member 75 as the enlarged head 85 prevents removal in one direction and the threaded shank portion 86 prevents removal in the opposite direction.

In this manner, it can be seen that the three mounting bolts 37 for the subassembly 20 of this invention are retained by the subassembly 20 and will not become loose therefrom so that the bolts 37 will be in proper assembled positions for subsequently threading into the threaded openings 39 of an engine block 35 when the subassembly 20 is assembled thereto in the manner previously set forth whereby the enlarged heads 85 are compacted against the ends 77 of the inserts 75 when the threaded shank portions 86 are fully threaded into the threaded openings 39 of the engine 35 as illustrated in FIG. 5 so that the outlet housing 21 is firmly fastened thereto to complete the assembly with the engine 35 as illustrated in FIG. 5.

Thus, it can be seen that with the present invention, it will be necessary only for the engine assembly operator to place the subassembly 20 onto the surface 34 of the engine 35 and thread the bolts 37 into the threaded openings 39 and thereby save time and labor costs over the previous arrangements.

Should it be found that sometime during the subsequent use of the engine 35 that carries a subassembly 20 of this invention the thermostat 25 thereof needs to be replaced, it can be seen that since there is no adhesive used in the subassembly 20 of this invention to secure the thermostat 25 in place, it is only necessary, once the outlet housing 21 is unbolted from the engine 35, for the thermostat 25 to be removed with a screwdriver or similarly shaped tool and another thermostat 25 installed in the manner previously set forth.

However, if a thermostat 25 of this invention is not readily available to replace the worn-out thermostat 25, a conventional thermostat can be utilized even though the same does not have the tab means 49 nor the covering 54 of this invention because the replacing of a worn-out thermostat 25 is not under a time restraint feature that is associated with the initial engine assembly operation so that the retention feature is not nearly so important. Thus, the prior known thermostat can be inserted into the outlet housing and be retained therein by the prior known positioning means 41 and 47 as previously set forth and a normal paper or composite-type gasket can be utilized therewith to seal the outlet housing 21 and prior known thermostat back onto its assembly relationship with the engine 35 by utilizing the bolts 37 in the manner previously set forth.

Therefore, it can be seen that this invention not only sets forth a new vehicle cooling system subassembly and parts therefor, but also this invention sets forth new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a vehicle cooling system subassembly comprising an outlet housing having an opening therein, and a vehicle type thermostat disposed in said opening of said outlet housing and having a housing means provided with a valve seat that is controlled by a movable valve member which is interconnected to a temperature responsive device that is carried by said housing means, said thermostat housing means being rotationally oriented in said opening of said outlet housing in a desired rotational position thereof, the improvement wherein said outlet housing has slot means therein and wherein said thermostat housing means has tab means extending outwardly therefrom and wedgingly disposed in said slot means to hold said thermostat in said opening of said outlet housing in said desired rotational position thereof.

2. A subassembly as set forth in claim 1 wherein said thermostat housing means has an annular flange means, said tab means extending outwardly from said annular flange means and being substantially transverse thereto.

3. A subassembly as set forth in claim 2 wherein said outlet housing has an annular surface means engaged by said annular flange means of said thermostat, said slot means interrupting said annular surface means.

4. A subassembly as set forth in claim, 3 wherein said tab means comprises a plurality of tab constructions disposed in a spaced apart circular array on said annular flange, said slot means comprising a plurality of slot constructions disposed in a spaced apart circular array in said annular surface means and respectively receiving said tab constructions therein.

5. A subassembly as set forth in claim 4 wherein each said tab construction comprises a relatively rigid tab having a relatively flexible covering material thereon that wedges in its respective slot means against said outlet housing to frictionally hold said thermostat in said desired rotational position thereof.

6. A subassembly as set forth in claim 5 wherein said covering material of each tab construction defines a wedge-shaped leading edge.

7. A subassembly as set forth in claim 4 wherein each said slot construction has two sections one of which is wider than the other.

8. A subassembly as set forth in claim 7 wherein said tab constructions are initially inserted respectively in the wider sections of said slot constructions and are then wedged in the narrower sections of said slot constructions when said thermostat is rotated to said desired rotational position thereof.

9. A subassembly as set forth in claim 1 wherein said outlet housing carries a plurality of mounting bolts for mounting said subassembly to a vehicle engine or the like.

10. A subassembly as set forth in claim 9 wherein said outlet housing has a plurality of bolt retaining means respectively holding said mounting bolts to said subassembly.

11. A subassembly as set forth in claim 10 wherein each said bolt retaining means comprises a member having opposed ends and an opening passing through said ends with a portion of its respective bolt disposed in said opening thereof and having an enlarged head adjacent one of said ends of its respective member, each said member having an annular portion at said one of said ends thereof that has been turned inwardly at said opening thereof to provide a retaining abutment between said enlarged head of its respective bolt and the threads on that bolt whereby said annular portion retains its respective bolt to said subassembly.

12. A subassembly as set forth in claim 1 wherein said thermostat housing means has an annular flange means that comprises a relatively rigid and flat annular band that has opposed sides and an outer generally circular peripheral edge and a relatively flexible covering material covering said opposed sides and said peripheral edge, said outlet housing having an annular surface means engaging one side of said flange means.

13. A subassembly as set forth in claim 12 wherein said flexible covering material is molded onto said band of said thermostat.

14. In a vehicle type thermostat for being disposed in an opening of an outlet housing of a vehicle cooling system, said thermostat having a housing means provided with a valve seat that is controlled by a movable valve member which is interconnected to a temperature responsive device that is carried by said housing means, said thermostat housing means being adapted to be rotationally oriented in said opening of said outlet housing in a desired rotational position thereof, the improvement wherein said thermostat housing means has tab means extending outwardly therefrom for being wedgingly disposed in slot means in said outlet housing to hold said thermostat in said opening of said outlet housing in said desired rotational position thereof.

15. A thermostat as set forth in claim 14 wherein said thermostat housing means has an annular flange means, said tab means extending outwardly from said annular flange means and being substantially transverse thereto.

16. A thermostat as set forth in claim 15 wherein said tab means comprises a plurality of tab constructions disposed in a spaced apart circular array on said annular flange.

17. A thermostat as set forth in claim 16 wherein each said tab construction comprises a relatively rigid tab having a relatively flexible covering material thereon for wedging in its respective slot means against said outlet housing to frictionally hold said thermostat in said desired rotational position thereof.

18. A thermostat as set forth in claim 17 wherein said covering material of each tab construction defines a wedge-shaped leading edge.

19. A thermostat as set forth in claim 14 wherein said thermostat housing means has an annular flange means that comprises a relatively rigid and flat annular band that has opposed sides and an outer generally circular peripheral edge and a relatively flexible covering material covering said opposed sides and said peripheral edge.

20. A thermostat as set forth in claim 19 wherein said flexible covering material is molded onto said band of said thermostat.

21. In an outlet housing for a vehicle cooling system and having an opening therein for receiving a vehicle type thermostat therein and that has a housing means provided with a valve seat that is controlled by a movable valve member which is interconnected to a temperature responsive device that is carried by said housing means, said outlet housing being adapted to have said thermostat rotationally oriented in said opening of said outlet housing in a desired rotational position thereof, the improvement wherein said outlet housing has slot means therein for receiving therein tab means that extend outwardly from said thermostat and will be wedgingly disposed in said slot means to hold said thermostat in said opening of said outlet housing in said desired rotational position thereof.

22. An outlet housing as set forth in claim 21 wherein said outlet housing has an annular surface means adapted to be engaged by an annular flange means of said thermostat, said slot means interrupting said annular surface means.

23. An outlet housing as set forth in claim 22 wherein said slot means comprises a plurality of slot constructions disposed in a spaced apart circular array in said annular surface means for respectively receiving said tab constructions therein.

24. An outlet housing as set forth in claim 23 wherein each said slot construction has two sections one of which is wider than the other.

25. An outlet housing as set forth in claim 21 wherein said outlet housing carries a plurality of mounting bolts for mounting said outlet housing to a vehicle engine or the like.

26. An outlet housing as set forth in claim 25 wherein said outlet housing has a plurality of bolt retaining means respectively holding said mounting bolts to said outlet housing.

27. An outlet housing as set forth in claim 26 wherein each said bolt retaining means comprises a member having opposed ends and an opening passing through said ends with a portion of its respective bolt disposed in said opening thereof and having an enlarged head adjacent one of said ends of its respective member, each said member having an annular portion at said one of said ends thereof that has been turned inwardly at said opening thereof to provide a retaining abutment between said enlarged head of its respective bolt and the threads on that bolt whereby said annular portion retains its respective bolt to said subassembly.

* * * * *

UNITED STATES PATENT AND TRADEMARK OFFICE
CERTIFICATE OF CORRECTION

PATENT NO. :     4,982,704
DATED      :     January 8, 1991
INVENTOR(S) :    Boyd P. Sliger It is certified that error appears in the above—identified patent and that said Letters Patent is hereby corrected as shown below:

On the Title page, insert after item [73],

-- The term of this patent subsequent to April 3, 2007, has been disclaimed.--.

Signed and Sealed this

Thirty-first Day of August, 1993

*Attest:*

BRUCE LEHMAN

*Attesting Officer*        *Commissioner of Patents and Trademarks*